United States Patent [19]
Pettersson et al.

[11] Patent Number: 4,801,224
[45] Date of Patent: Jan. 31, 1989

[54] TOOL AND INSERT FOR CHIP REMOVAL

[75] Inventors: Lars T. Pettersson; Jörgen V. Wiman, both of Sandviken, Sweden

[73] Assignee: Santrade Limited, Lucerne, Switzerland

[21] Appl. No.: 35,015

[22] Filed: Apr. 6, 1987

[30] Foreign Application Priority Data

Apr. 7, 1986 [SE] Sweden ................ 8601533

[51] Int. Cl.⁴ .......................... B23P 15/28
[52] U.S. Cl. ...................... 407/110; 407/50; 407/117
[58] Field of Search ............... 407/50, 66, 109, 110, 407/107, 117; 83/845

[56] References Cited

U.S. PATENT DOCUMENTS 4,001,925  1/1977  Eriksson .................. 407/107
4,558,974 12/1985  Rano ....................... 407/50
4,580,930  4/1986  Zinner .
4,588,333  5/1986  Gustafson .

FOREIGN PATENT DOCUMENTS 3119834 12/1982 Fed. Rep. of Germany .
3319799 12/1984 Fed. Rep. of Germany ...... 407/107

Primary Examiner—Frederick R. Schmidt
Assistant Examiner—Robert Showalter
Attorney, Agent, or Firm—Burns, Doane, Swecker & Mathis

[57] ABSTRACT

The invention relates to a tool for chip removal comprising a cutting insert mechanically clampable within a slot of a holder. The insert is clamped by the resilient force arising during deflection of a clamping arm provided in the holder. The insert and the clamping arm are engageable at contact regions separated from each other, a first contact region of which forms an acute angle relative to the lower side of the insert.

13 Claims, 4 Drawing Sheets

TOOL AND INSERT FOR CHIP REMOVAL

BACKGROUND AND OBJECTS OF THE INVENTION

The present invention relates to a tool for chip removing machining, preferably for parting, comprising an insert mechanically clampable to a holder. The insert is arranged to be clamped in a slot in the holder by means of the spring-load that arises between the walls of the slot when the insert is pushed inwardly in the slot without a previous deflection of one of the slot walls. The invention further relates to an insert to be clamped in said holder.

Zinner U.S. Pat. No. 4,580,930 shows a parting tool wherein a cutting insert is held within a slot in a holder body. The clamping force which acts upon the insert is dependent on the cutting forces arising during machining of a work piece.

Gustafson U.S. Pat. No. 4,588,333 discloses a parting tool. The position of the cutting edge of a cutting insert is dependent upon the cutting forces arising during parting of a work piece.

German Published Application No. 31 19 834-A1 shows a parting tool wherein a cutting insert is held by a cassette inserted within a holder body.

Accordingly, it is a principal object of the present invention to shape the tool such that the insert achieves a carefully defined stop in the longitudinal direction of the insert independent of the magnitude of the cutting forces acting upon the insert.

A further object of the present invention is to extend the life of the holder forming a part of the tool.

Another object of the present invention is to reduce the tolerance sensitivity of the tool.

A still further object of the present invention is to minimize the risk for insert breakage by means of the configuration of the cooperating surfaces of the insert and the holder.

A still further object of the present invention is to shape said surfaces such that the insert may be pushed inwardly into the holder using mainly constant pushing force until the insert reaches said stop.

A still further object of the present invention is to shape the tool such that the position of its cutting edge becomes independent of the position of the insert in the holder.

THE DRAWING

The invention will be more clearly described in connection with the following drawings in which.

DESCRIPTION OF A PREFERRED EMBODIMENT OF THE INVENTION

Figure 4:
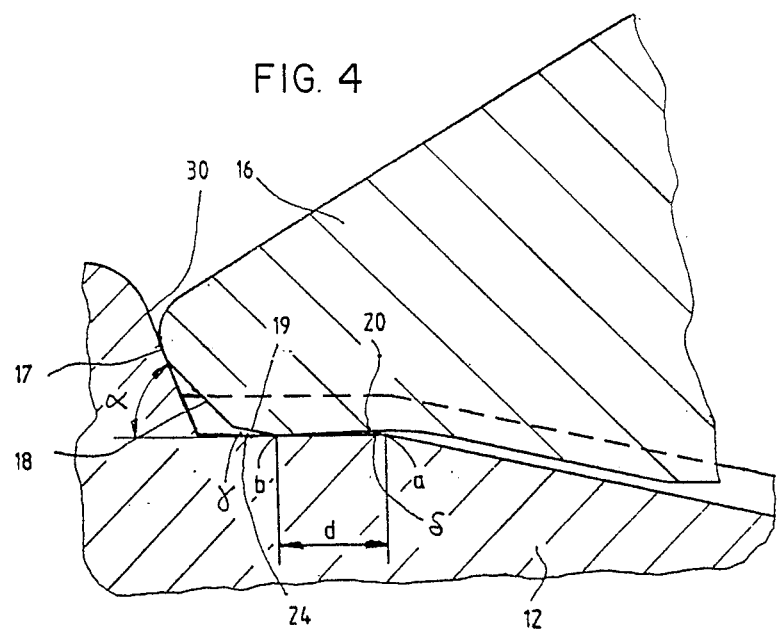
FIG. 4 shows the tool in section according to the line IV—IV in FIG. 2.

A parting or grooving tool 10 according to the invention is shown in the figures comprising a holder 11 and an insert 12. The tool and the insert have a midline M. The holder 11 has an end, not shown, which is supposed to be secured to a machine. The free end of the holder is provided with a slot 13 whose first and second walls 14, 15 have mainly V-shaped cross-section. The slot 13 allows deflection of the upper portion of the holder which thereby forms an integral cantilever-type clamping arm 16 arranged to clamp the insert between the walls of the slot by means of resilient force when the insert is pushed inwardly into the slot. The legs of each V-shaped wall meet in a rounded-off portion and they enclose an internal obtuse angle. The front surface of the clamping arm 16 is comprised of a planar abutment surface 17, which form an angle $\alpha$ with the opposite slot wall 14. The angle $\alpha$ is at least 70 degrees. The abutment surface 17 determines the final position of the insert 12 in the slot. The slot wall 14 is mainly parallel with the feed direction A of the tool. The abutment surface 17 is terminated in a direction toward the slot wall 14 at a planar bevel or recessed surface portion 18 which forms an angle of about 45 degrees with the wall 14, and thus converges towards the wall 14 in a direction inwardly into the slot. The bevel 18 meets an inclined first surface 19 at a juncture c, FIG. 4, which surface forms an angle $\gamma$ about 11 to 14 degrees with the wall 14 in direction inwardly into the slot. The first surface 19 meets a second surface 20 at a juncture b, (FIG. 4), which second surface diverges from the wall 14 in a direction inwardly into the slot, thereby forming an angle $\delta$ of about 1 to 2 degrees with the wall 14. As for the rest of the wall 15 it is arranged at a distance from the insert 12.

Figure 1:
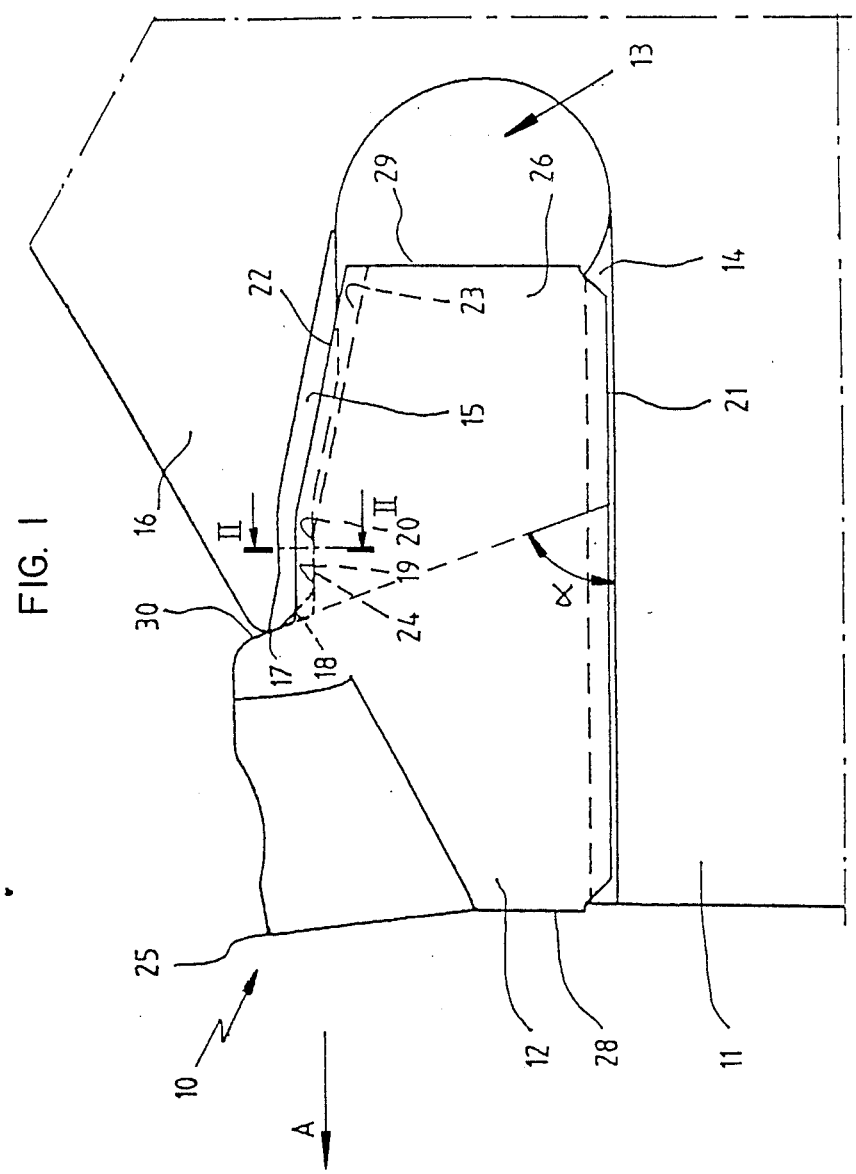
FIG. 1 shows a section of the tool in a side view.
Figure 2:
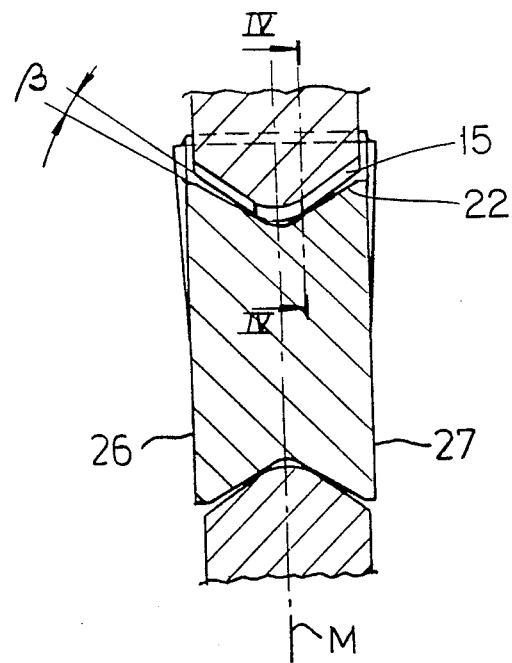
FIG. 2 shows the tool in section according to the line II—II in FIG. 1.

The insert 12 consists of sintered hard metal and comprises a pair of longitudinally extending V-shaped first and second surfaces 21, 22 partly enclosing an acute angle and partly forming a wedge-shaped insert body, i.e., its narrower rear portion is wedge-shaped and encloses an angle of about 12 to 15 degrees. A first longitudinally extending surface 21 is parallel with the feed direction of the tool. By "feed direction" is understood all directions in the x-z-plane of the machine, where x depicts the radial direction, and z the axial direction. A second longitudinally extending surface 22 comprises a plurality of mutually inclined front and rear portions 23, 24, which form an included obtuse angle B (see FIG. 3). The rear portion 24 terminates rearwardly at a location separated from the first surface 21 by a rear face 29. The rear portion 24 forms a wedge angle C with the first surface 21. The surface 21 is provided to slide on the lower wall 14 of the slot and the portions 23, 24 are provided to slide on the upper wall 15. The legs of each V-shaped longitudinally extending surface meet in a central rounded-off portion (see FIG. 2) and they form an external obtuse angle which is larger than the internal angle between corresponding portions at the holder. The V-shaped surfaces of the insert and the corresponding portions at the holder form a play at the midline M such that no abutment occurs. Thus, mainly line-contact occurs between the surface 21 and the wall 14, while mainly point-contact occurs between the portion 24 and the wall 15 at each side of the midline M, (FIG. 2) of the tool during the final phase of insertion.

The broader, front part of the insert body is provided with a cutting edge arranged to part or to face a work piece, not shown. Furthermore, the insert is provided with mainly plane-parallel side faces 26, 27 and transversely directed front and rear end faces 28, 29. The portion 24 is mainly parallel with the surface 21 or is somewhat inclined such that it diverges from the surface 21 in a direction inwardly into the slot 13. A planar abutment surface 30 on the insert body is connected to the portion 24 and forms an acute angle α, at least 70 degrees, with the surface 21 or wall 14.

Figure 3:
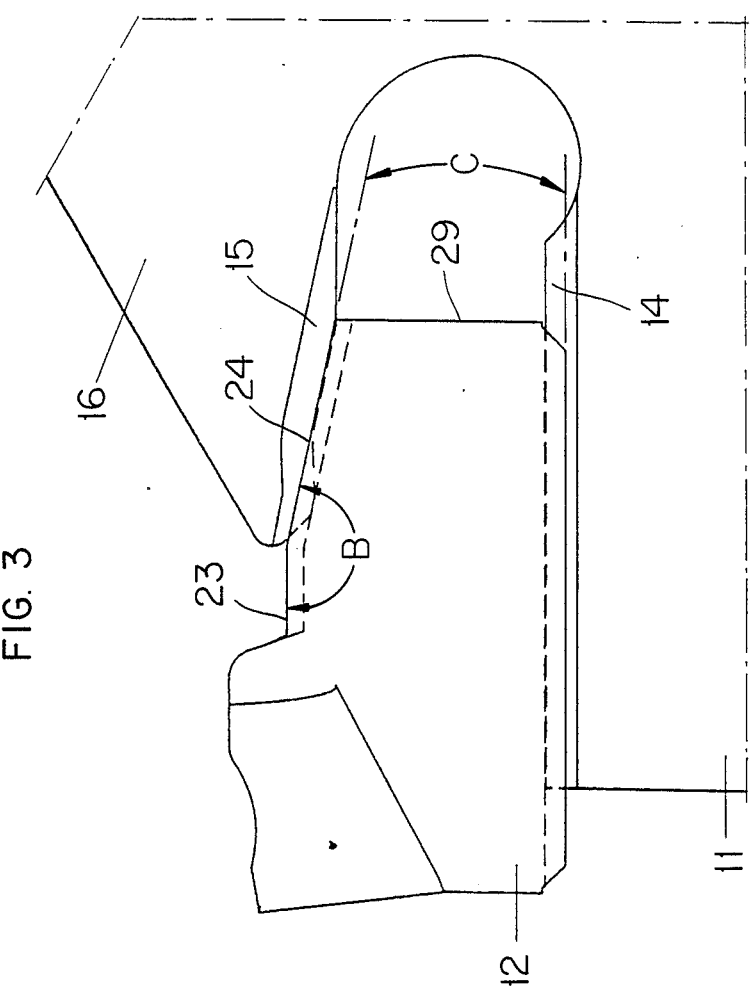
FIG. 3 shows the tool in side view during insertion of an insert.
Figure 5:
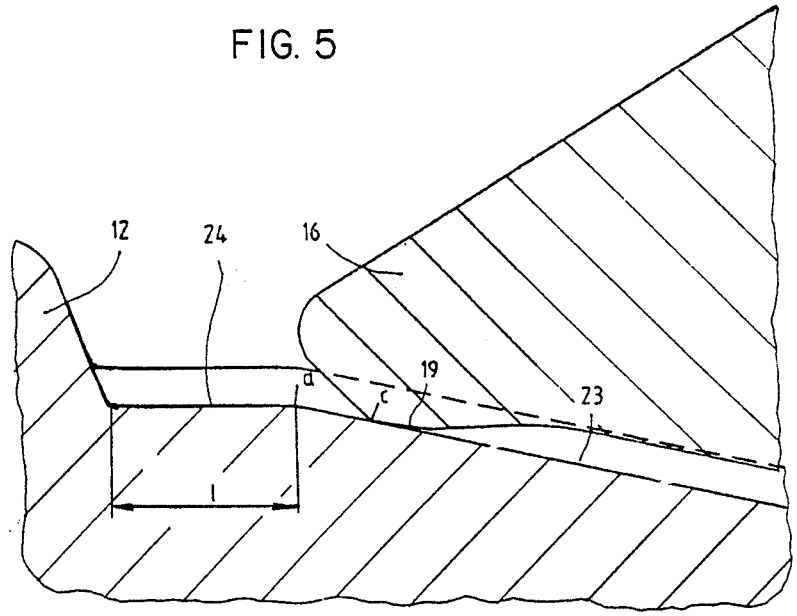
FIG. 5 shows a section of the tool according to FIG. 3 in a view corresponding to that of FIG. 4.

The insert 12 is pushed into the slot 13 during insertion of the insert into the holder such that the front part of the first surface 19 of the clamping arm 16 abuts against the inclined portion 23 of the insert, FIGS. 3 and 5. The surface 19 forms an angle γ with the lower wall 14 or with the portion 24 parallel with that wall, the angle being less than the wedge angle for the narrower part of the insert and, therefore, the front part of the surface 19 will always define the first abutment of the clamping arm against the insert. This configuration allows wear of the surface 19 without the point of wear being essentially moved. Further insertion of the insert will result in a deflection of the clamping arm 16 until the surface 19 reaches a juncture a between the mutually inclined portions 23, 24. The contact point between the insert and the clamping arm is thereby displaced from the front part of the surface 19 to its juncture b with the second surface 20, FIG. 4. Further insertion does not result in a further deflection of the clamping arm but the breakpoint b slides with constant friction on the portion 24, which in the preferred embodiment is parallel with the lower surface 21 of the insert. The juncture b is worn exclusively along the surface 24. Finally, the planar abutment surface 30 of the insert abuts against the planar abutment surface 17 of the clamping arm, such that further insertion of the insert is prevented, thereby achieving the working position of the insert. The bevel 18 of the clamping arm is shaped to create a play between the clamping arm and the insert. Thus, the risk for climbing of the clamping arm on the insert is reduced, which risk furthermore is reduced, through the fact that the contact region defined by the surfaces 17 and 30 forms the angle γ with the wall 14 or the surface 21. The angle γ between the surface 20 and the portion 24 allows wear of the juncture b without the point contact being displaced in a direction inwardly into the slot, i.e., there is no chance for the insert to tilt around the juncture a. The distance d between the junctures a and b is 20 to 50 percent of the length of the surface 24. The distance d is preferably 0.3–1 mm and the length l is preferably 1–2 mm.

The angle difference β is about 1 to 3 degrees between the slot walls 14, 15 and the surfaces 21, 23, 24 of the insert which gives contact places close to the midline M, reduces the risk for shivering along the lines of intersection between the surfaces 21, 23, 24 and the surfaces 26, 27. Shivering is a common cause of insert breakage.

Since the cooperating surfaces 14 and 21 are parallel with the feed direction A, the position of the cutting edge 25 will not change the in height direction during the insertion of the insert. This is advantageous if the operator for some reason has not inserted the insert fully, which would not result in false height tolerances on the work piece.

Thus, the invention relates to a tool for chip removing machining, preferably for parting or grooving through which configuration the following advantages are obtained:

the insert of the tool has a carefully defined stop irrespective of the magnitude of the cutting forces acting upon the insert, the life of the holder is extended since the the distance between the slot walls is maintained mainly constant during the final phase of insertion, the cooperating surfaces of the insert and the holder reduce the risk for insert breakage, the insert can be inserted during constant insertion force until it reaches said stop, and the height position of the cutting edge is independent of the position of the insert in the holder.

We claim:

1. A parting or grooving tool comprising a holder and an insert removably securable in said holder, said insert including:

front and rear ends, said front end containing a cutting edge, said rear end including a rear face, first and second front-to-rear extending surfaces of generally V-shaped cross-section facing in opposite directions, said second surface comprising a front portion and a rear portion, said rear portion converging rearwardly at a first acute angle relative to said first surface to define therewith a wedge angle of said insert, said rear portion terminating rearwardly at a location separated from said first surface by said rear face, said front portion extending forwardly from said rear portion at an obtuse angle relative thereto, an abutment surface disposed adjacent a front end of said front portion of said second surface and including a planar portion which diverges forwardly relative to said first surface at a second acute angle relative thereto, said holder including:

a forwardly opening slot formed by first and second front-to-rear extending walls of V-shaped cross-section, said walls facing one another and engaging said first and second surfaces, respectively, said first wall and said first surface extending parallel to a feed direction of said tool, and a clamping arm containing said second wall, said arm extending forwardly in cantilever fashion so as to be resiliently flexed away from said first wall by said rear portion of said second surface during insertion of said insert into said slot, said clamping arm including a front end abutting said planar portion of said abutment surface to define therewith a first contact region, and said second wall including a recessed portion extending rearwardly from said first contact region in non-contacting relationship with said insert, whereby said first contact region terminates short of a juncture between said abutment surface and said second surface, said second wall being in clamping contact with said front portion of said second surface at a second contact region when said arm is in contact with said abutment surface at said first contact region, said recessed portion being disposed intermediate said first and second contact regions, said rear face of said insert being spaced forwardly of a rear end of said slot when said arm contacts said insert at said first contact region, such that substantially all rearwardly directed forces tending to push said insert farther into said slot are resisted by said arm at said first contact region, said recessed portion of said second wall defining an interruption of contact between said front end of said arm and said abutment surface to minimize a tendency for said arm to ride up on said abutment surface in response to said rearwardly directed forces.

2. A tool according to claim 1, wherein said second wall includes an inclined portion extending rearwardly from a rear end of said recessed portion, said inclined portion forming a rearwardly open acute angle with said rear portion of said second surface when said clamp arm engages said rear portion, and forming a forwardly open acute angle with said front portion of said second surface when said clamp arm is in contact with said abutment surface, whereby only a front end of said inclined portion contacts said rear portion during sliding of said clamp arm along said rear portion, and only a rear end of said inclined portion contacts said front portion during sliding of said clamp arm along said front portion.

3. A tool according to claim 2, wherein said front portion of said second surface is disposed parallel to said first surface, a distance between a juncture of said first and second portions and said rear end of said inclined portion being from 20 to 50 percent of a length of said front portion when said clamp arm is in contact with said abutment surface.

4. A tool according to claim 3, wherein said second wall includes a portion extending rearwardly from said rear end of said inclined portion and forming a rearwardly open acute angle with said front portion when said clamp arm is in contact with said abutment surface.

5. A tool according to claim 2, wherein said forwardly open acute angle is about 11 degrees.

6. A tool according to claim 2, wherein an imaginary plane passing through apexes of said V-shaped first and second surfaces and said V-shaped first and second walls constitutes a midplane of said insert, said surfaces and walls being configured such that said second surface makes point contact with said second wall on opposite sides of said midplane and said first surface makes line contact with said first wall on opposite sides of said midplane.

7. A tool according to claim 6, wherein one of said V-shaped first surface and V-shaped first wall forms a V-shaped recess and the other thereof forms a V-shaped projection received in said recess, said V-shaped recess and projection forming included angles which are of different size.

8. A tool according to claim 7, wherein said included angle of said V-shaped recess is larger than said included angle of said V-shaped projection.

9. A tool according to claim 8, wherein the difference in size between said included angles is from 1 to 3 degrees.

10. A tool according to claim 7, wherein one of said V-shaped second surface and V-shaped second wall forms a V-shaped recess and the other thereof forms a V-shaped projection received in said last-named recess, said last-named V-shaped recess and projection forming included angles which are of different size to establish said point contact.

11. A tool according to claim 10, wherein said included angle of said last-named V-shaped recess is larger than said included angle of said last-named V-shaped projection.

12. A tool according to claim 11, wherein the difference in size between said included angles is from 1 to 3 degrees.

13. A tool according to claim 1, wherein said second acute angle is at least 70 degrees.

* * * * *